United States Patent [19]

Gritter et al.

[11] Patent Number: 4,990,844
[45] Date of Patent: Feb. 5, 1991

[54] DC BRAKING OF INVERTER-DRIVEN AC MOTORS

[75] Inventors: David J. Gritter, Racine; David M. Messersmith, Kenosha, both of Wis.

[73] Assignee: Eaton Corporation, Cleveland, Ohio

[21] Appl. No.: 423,811

[22] Filed: Oct. 18, 1989

[51] Int. Cl.$^5$ ............................................. H02P 3/18
[52] U.S. Cl. ................................... 318/762; 318/763; 318/729; 318/757; 318/362
[58] Field of Search ................................ 318/362–374, 318/741–820; 364/41, 127, 137

[56] References Cited

U.S. PATENT DOCUMENTS

4,833,386 5/1989 Unsworth ..................... 318/757 X

Primary Examiner—William M. Shoop, Jr.
Assistant Examiner—Paul Ip
Attorney, Agent, or Firm—C. H. Grace

[57] ABSTRACT

A DC braking system for an inverter-driven induction motor, (e.g., three-phase). When a braking command occurs, the normal gating sequence of the inverter stops. Mode 1 of the braking procedure starts. In Mode 1, two semiconductor phase switches of the group connected with one of the DC buses and the semiconductor switch of the third phase that is connected with the other DC bus are latched in a conducting state. The motor essentially receives DC current, which increases until it actuates a current limit device, clearing the latch. Then all six switches are turned off. That drives the motor current through the back-biased parallel diodes. The negative DC bus voltage is available to suppress motor current despite large motor speed voltages. The apparatus repeats the Mode 1 procedure for a predetermined time interval, after which Mode 2 of the braking procedure starts. In Mode 2, just as in Mode 1, two switches of one bus and one switch of another bus conduct until an overcurrent limit is reached. Then the one switch which is connected to a different bus turns off and its complement (same phase, other bus) turns on, allowing motor current to circulate in the motor windings. This allows current to decay at a slower rate than it would in Mode 1. The procedure of Mode 2 is repeated for a predetermined time interval. If the motor speed is below a predetermined threshold when the braking command occurs, Mode 1 is skipped and only Mode 2 is used.

4 Claims, 8 Drawing Sheets

DC BRAKING OF INVERTER-DRIVEN AC MOTORS

FIELD OF THE INVENTION

The present invention relates to control circuits for energizing, controlling, and in particular for braking an AC motor of the induction type. It is for a type of motor controller that has an adjustable-frequency drive that controls the frequency and voltage of power applied to the motor.

BACKGROUND OF THE INVENTION

A motor controller suitable for making use of the present invention, which is a braking system, may energize the motor through an inverter circuit having a plurality of electronic switches that control the polarity of voltage applied to the motor's windings. A three-phase inverter having a pair of switching transistors for each phase can be used with a three-phase induction motor.

A controller for such a system often includes a programmable microprocessor for generating a pulse-width-modulated (PWM) output, which can be changed by the microprocessor, for application to the motor. In a three-phase induction motor application, in which three windings are energized, the microprocessor and its logic circuits generate three digital output signals that are pulsewidth-modulated to approximate sine waves 120 degrees out of phase.

Whenever voltage is to be applied to the motor, two of the three digital outputs from the logic circuits have the same state, i.e., they are either high or low, and the third output is of the opposite state. Whenever zero voltage is to be applied to the motor, the three outputs are all of the same polarity. Motor voltage is established by controlling the amount of time spent in the zero voltage state relative to the time spent with voltage applied to the motor. These zero-voltage time intervals are often called "notches". The states of the digital outputs control the conductivity of respective electronic switches of the inverter.

Prior art apparatus of the type that is being described here briefly as background is described in more detail in U.S. Pat. application Ser. No. 07/225,091, filed July 27, 1988, inventor David J. Gritter, and assigned to the assignee of the present invention. That application is made a part of this application and incorporated herein by reference.

For safety and to prevent nuisance tripping of the drive, a current-limiting circuit sometimes is provided to monitor the DC bus current, which is proportional to the current flowing through the motor windings, and to generate a second modulation signal based upon the bus current. The bus current signal is compared in a comparator circuit with a reference signal generated by the microprocessor. When the bus current signal exceeds the reference signal, an output from the current limit circuit is applied to the microprocessor and/or logic circuit to impose a control similar to the modulation scheme imposed by the microprocessor speed control. The three sinusoidally-modulated signals are kept from advancing in phase and the motor voltage is forced to zero.

In normal operation the PWM inverter applies a frequency and voltage to the motor to obtain rated flux and establish an output speed. The back emf of the motor (i.e., "speed voltage", induced by flux in the rotor), equals the rotor speed times the flux. It opposes and approximately counters the applied terminal voltage so that the motor currents are well behaved. Voltage control is accomplished by periodically inserting zero-voltage "notches" in the waveform. Current-limit circuitry monitors the inverter's DC bus current and inserts additional notches whenever the bus current exceeds a predetermined value. These additional notches reduce both voltage and frequency and effectively control the peak transistor currents.

Since the notches act to short-circuit the motor's terminals, the motor's speed voltage (back-emf) is the only source available to reduce the amplitude of the motor's current. The notches are normally placed in a position in the waveform where the speed voltage of the motor is of the proper polarity to reduce motor current. If, however, the motor's speed voltage is not correctly oriented as to phase with respect to the applied terminal voltage, the speed voltage may not act to reduce the motor current during a notch. For example, if the speed voltage is forced to 180 degrees out of phase, it will always cause current to increase rather than decrease in a notch.

When DC braking is employed, the phase of the speed voltage with respect to the DC braking current is continuously varying and consequently periodically causes current to increase during a notch.

A conventional approach to providing DC braking of an induction motor controlled by an adjustable frequency drive utilizes a very-low-duty-cycle PWM DC voltage to impose a DC braking current in the motor. When this technique is used, the current level is dependent upon motor impedances, and its peak value may exceed the inverter trip level unless the drive is carefully adjusted. Furthermore, if this voltage is applied too rapidly, the motor's own speed voltage may cause the motor current to become uncontrolled. Thus it may be necessary to wait until the rotor flux has decayed essentially to zero before DC braking is enabled.

SUMMARY

This invention provides a DC braking apparatus and methods for use with adjustable speed drives and AC motors driven by them. More specifically, it provides a means of controlling peak motor current rather than average voltage during braking, to allow full utilization of the inverter's available switching capacity, and therefore to achieve maximum braking torque. It also provides two modes of control, namely one mode to give an initial low level of braking that is insensitive to speed voltage, but requires either high switching frequencies or a low average current, and a second mode which permits higher average currents.

A first object of the invention is to provide DC braking apparatus and methods for inverter-driven motors involving the steps of stopping the normal PWM waveform generator; turning on the main switches of two phases and the opposite main switch of the third phase; when a predetermined current limit is reached, turning off all switches to force a rapid decay of current.

A second object is to provide apparatus and methods involving the steps of stopping the normal PWM waveform generator; turning on the main switches of two phases and the opposite main switch of the third phase; when a predetermined current limit is reached, switching the opposite main switch of the third phase to the same state as that of the two main switches of the two phases; and maintaining the switches in those states even after the current of the drive decreases below the current limit.

Another object involves steps of the first object above, repeated for a predetermined time interval, followed by steps of the second object above, repeated for a predetermined time interval, so that a dual braking method is used.

Another object is to provide a method in which the dual braking method is employed except when speed data indicate a slow motor speed, in which event only the steps of the second object are carried out.

Still other objects are apparent from the description and claims of this invention.

DESCRIPTION OF PREFERRED EMBODIMENTS

Figure 1:
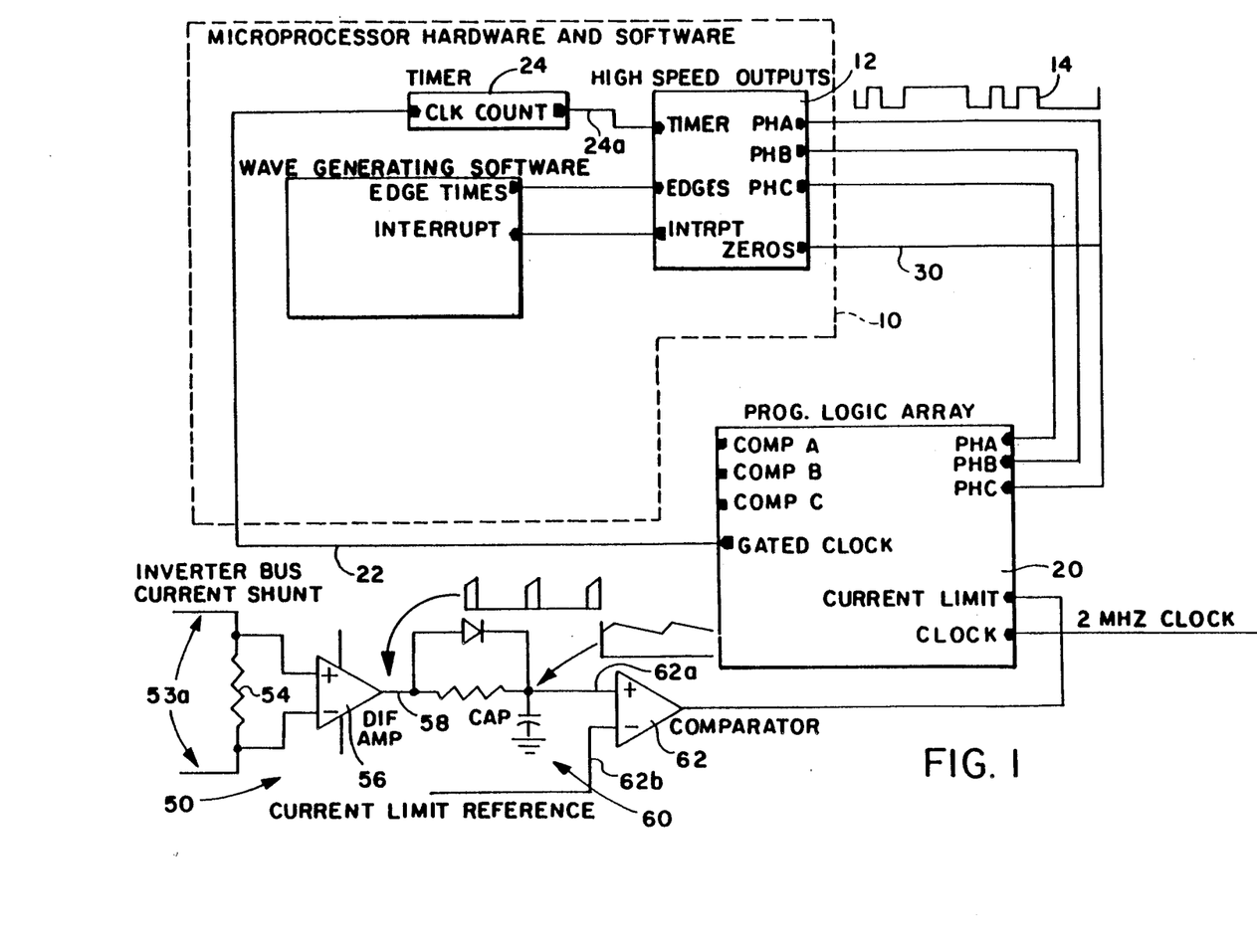
FIG. 1 is a block diagram of a motor control system of a type with which the present invention can be used for DC braking.
Figure 2:
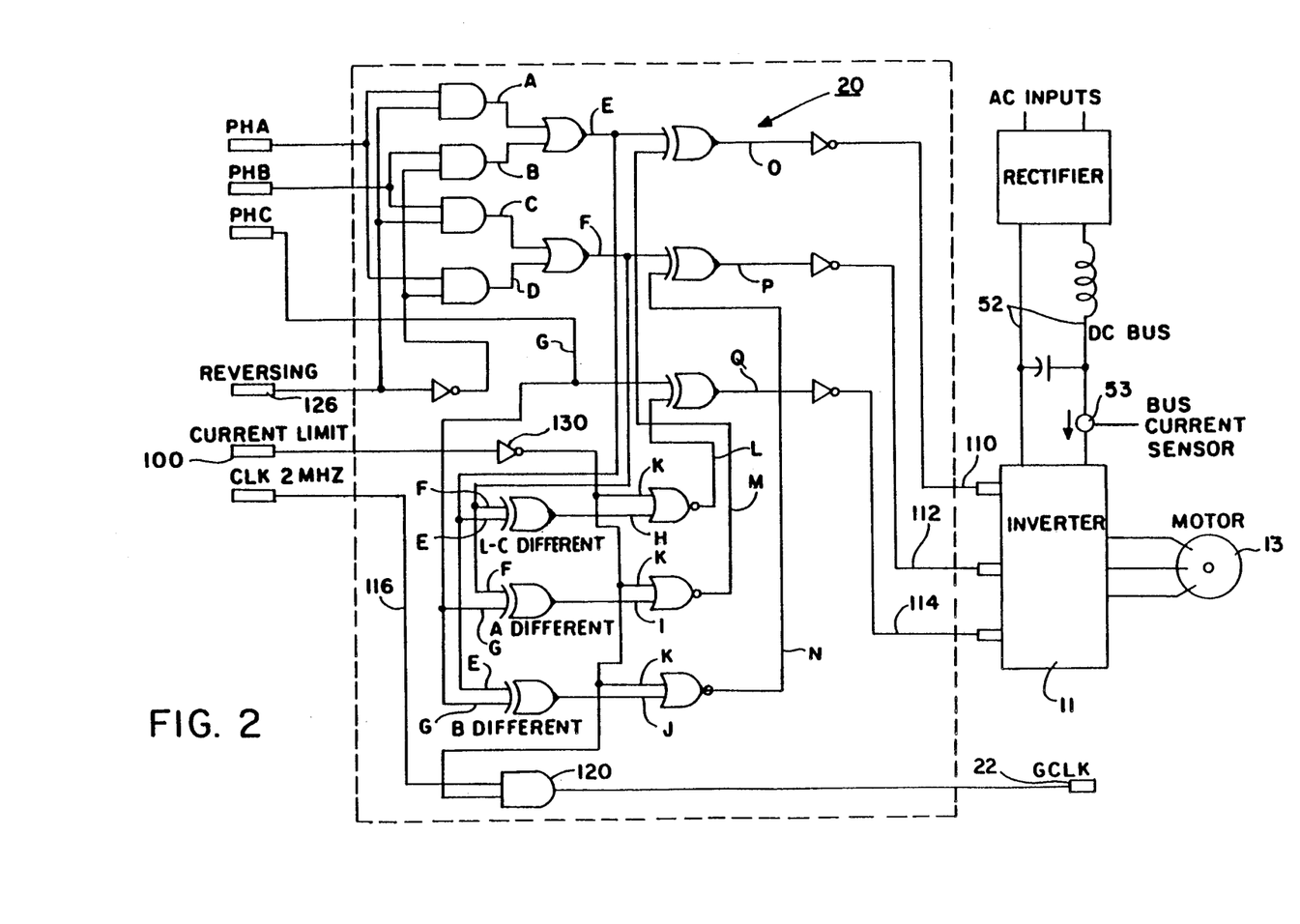
FIG. 2 is a schematic diagram of a logic circuit for modulating digital outputs from a microprocessor controller and for using the modified control signals to activate an inverter circuit.
Figure 3:
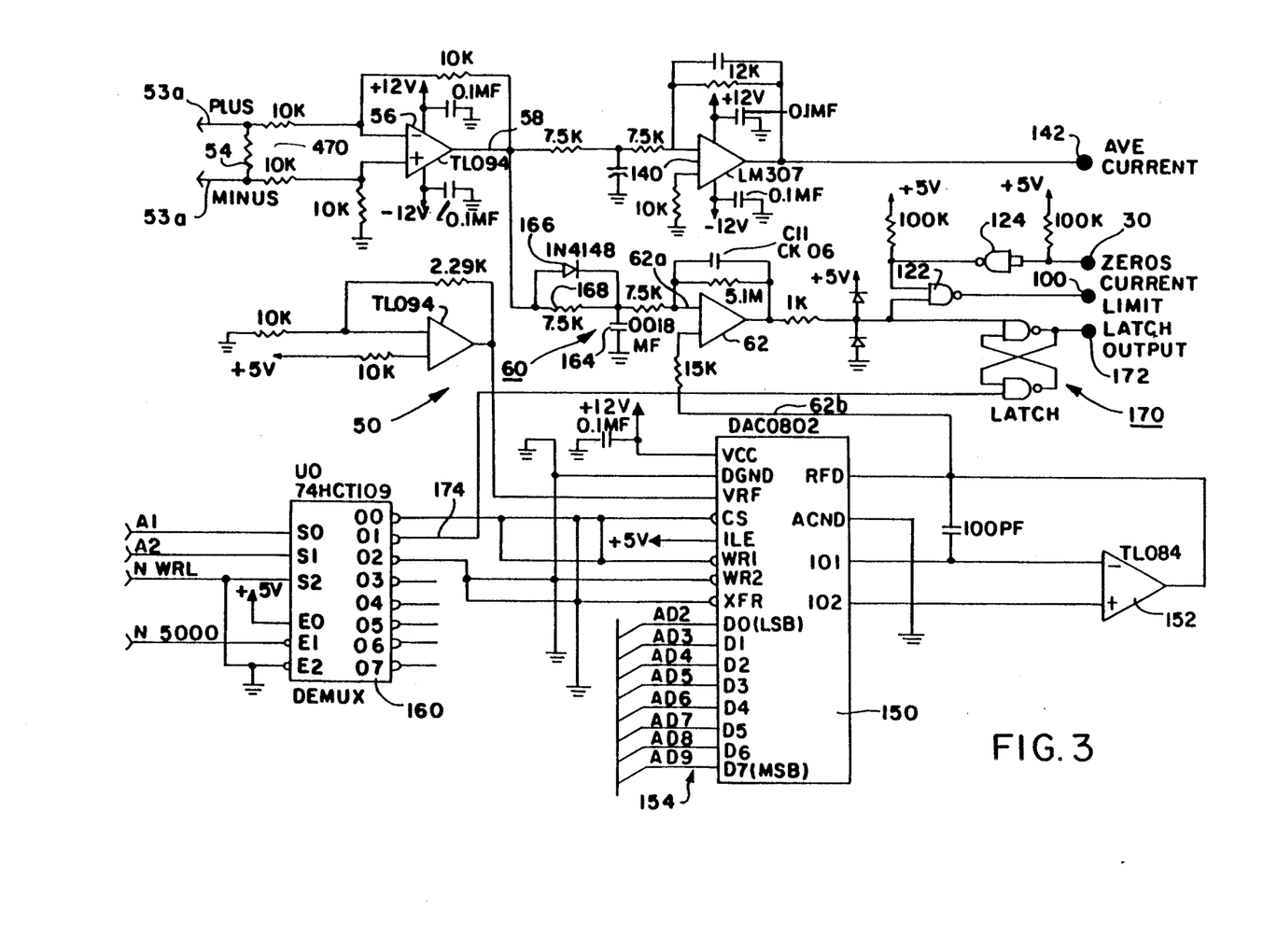
FIG. 3 is a schematic diagram of a current-limit circuit for monitoring motor current and providing a second modulation signal for use with the logic circuits of FIG. 2 and other figures.

FIGS. 1, 2 and 3 apply to this portion of the description. A preferred use of the microcomputer system 10 is for controlling the energization of a three phase motor 13. The motor is energized by a two-conductor DC bus 52 that is coupled across the motor windings by an inverter circuit 11 (FIG. 2). A prior art inverter circuit having switching transistors that are selectively rendered conductive by application of control inputs to the inverter is disclosed in U.S. Pat. No. 4,371,824 to David J. Gritter. The patent is assigned to the assignee of the present invention and is incorporated herein by reference.

In FIG. 1, a representative digital waveform 14 presented at the phase A output PHA from the high speed output block 12 is seen to include a series of on/off pulses. The microcomputer system 10 includes software for programming the duration of these pulses. In particular, in an application used in energizing a three-phase motor, the output on phase A is a repetitive waveform whose shape is programmed to approximate a sine wave having a desired frequency. The digital outputs at the phase B and phase C interface outputs PHB, PHC are also programmed to approximate sine waves, which are phase-shifted with respect to the phase A output.

The three digital outputs from the high speed output 12 are coupled to a programmable logic array 20 having logic circuitry (FIG. 2) that modulates or adjusts the digital outputs from the microcomputer output 12. Were it not for the modulation effects of the programmable logic array 20, the three phase-shifted outputs from the high speed output 12 would, in conjunction with the inverter circuit 11, drive a three-phase motor at a constant frequency and maximum voltage.

The microcomputer system 10 incorporates an Intel 8096 microprocessor that includes a high speed output that can be programmed to generate the phase A, phase B and phase C output signals. These signals are interrupt-driven based on a time base from an external clock signal at a clock input 22 (FIG. 1). A timer 24 is clocked by the clock signal 22. A time output 24a is coupled to the high speed output 12 which produces programmed transitions at the phase A, B and C outputs whenever the timer output 24a equals the programmed transition time.

FIG. 3 are additional circuit diagrams that are part of the inverter and may be of interest, but whose details need not be described in order to understand the present DC braking invention.

Figure 4:
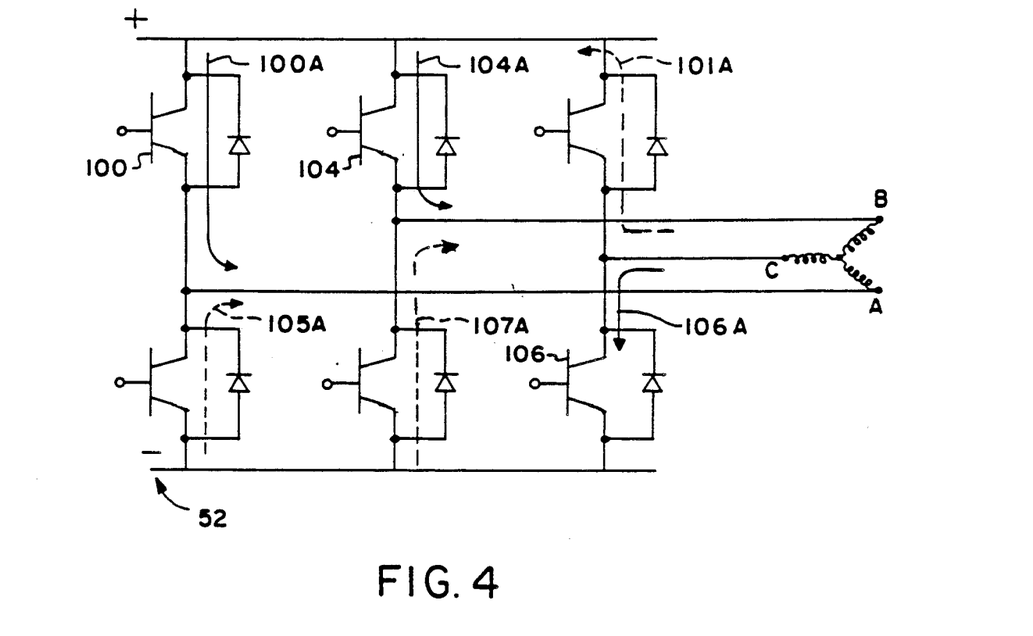
FIG. 4 is a schematic diagram of main semiconductor switches and back-diodes of the inverter when in braking Mode 1.
Figure 5:
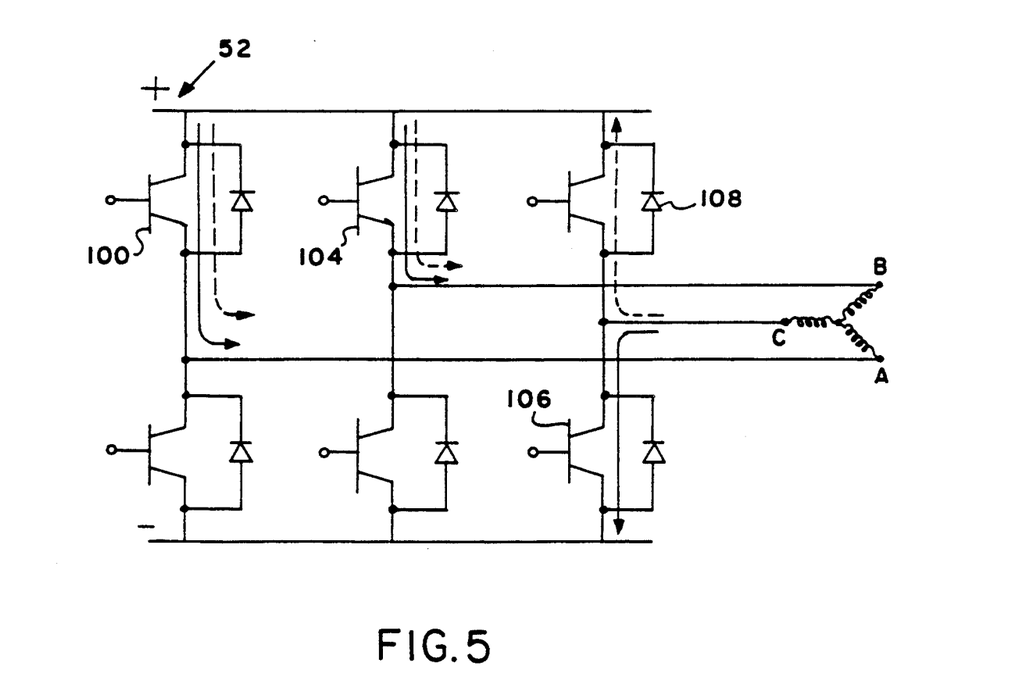
FIG. 5 is a schematic diagram of main semiconductor switches and back-diodes of the inverter when in braking Mode 2.

FIGS. 4 and 5 apply to this portion of the description. The present invention uses the same current limit signal as is employed in normal drive operation, to implement DC braking. Two modes of braking operation are described herein, both of which are preferably utilized at different times in the same apparatus.

In the first mode of operation a clock signal (or the equivalent software implementation) causes, for example, two "upper" inverter power switches 100, 104, and one "lower" inverter switch 106 to be latched on, applying bus voltage to the motor terminals A, B, C (as drawn in FIG. 4). The current, shown by the solid arrows 100A, 104A, 106A, increases until the current limit comparator 62, (FIG. 3), senses an overcurrent condition and clears the latch. This causes all three power switches 100, 104, 106 to be turned off, forcing the motor current to be commutated to the opposite inverse parallel diodes, as shown by the dashed arrows 101A, 105A, 107A.

As long as motor current continues to flow, the negative of bus voltage, which is always larger in magnitude than the motor's speed voltage, is available to cause the current to decrease. The rate of decrease continues to be a function of back emf, so the rate of decrease exhibits periodic variations. In order to maintain adequate control of current it is necessary to allow motor current to become discontinuous over part of the speed voltage cycle, and thus to suffer a high peak-to-average braking current ratio and thus to lower the average braking torque in this first mode.

Furthermore, this first mode recovers energy from the motor and places it on the bus whenever the back emf is of the proper polarity to assist in increasing current. Excessive braking currents could therefore cause the DC bus current to increase to the high bus trip level.

An alternative method would use a second current comparator to set the latch when the magnitude of bus current decreases below a predetermined level and thus re-enable the power switches. (This method would add to circuit complexity and require inverter switching frequencies much higher than normal, but may nevertheless be desirable for some applications.)

This first mode is employed repeatedly until the speed voltage is reduced to a level which will not force excessive currents through the motor's winding impedance. In practice, this means that the peak of the speed voltage must be equal to or less than the drop caused in the sum of the stator and rotor resistances by a current equal to the maximum allowable transistor current. This will typically be 5 to 10 percent of rated motor voltage. The speed voltage magnitude is proportional to the product of rotor speed and rotor flux. Rotor flux decays at the time constant of the motor, which is typically about ½ second.

The second mode of operation proceeds identically to the first in that it latches on, for example, two upper devices 100, 104, and one lower device 106 (FIG. 5, solid arrows). However, when the current limit signal occurs, instead of turning all devices off, it turns off only the lower device 106. The upper diode 108 in this phase then conducts, shorting all three motor terminals, and allowing the motor currents to freewheel toward zero (dashed arrows of FIG. 5).

Because only the semiconductor devices and the motor resistances are providing voltage drops to force current to fall, the rate of fall is quite slow and a low peak-to-average current ratio is established, allowing higher braking torques in the motor. (A higher average current can be tolerated without incurring peaks that are dangerously high.)

In both modes, the peak transistor current is controlled and the inverter is fully utilized without any need to "tune" the DC braking voltage to the particular motor being used.

Figure 6:
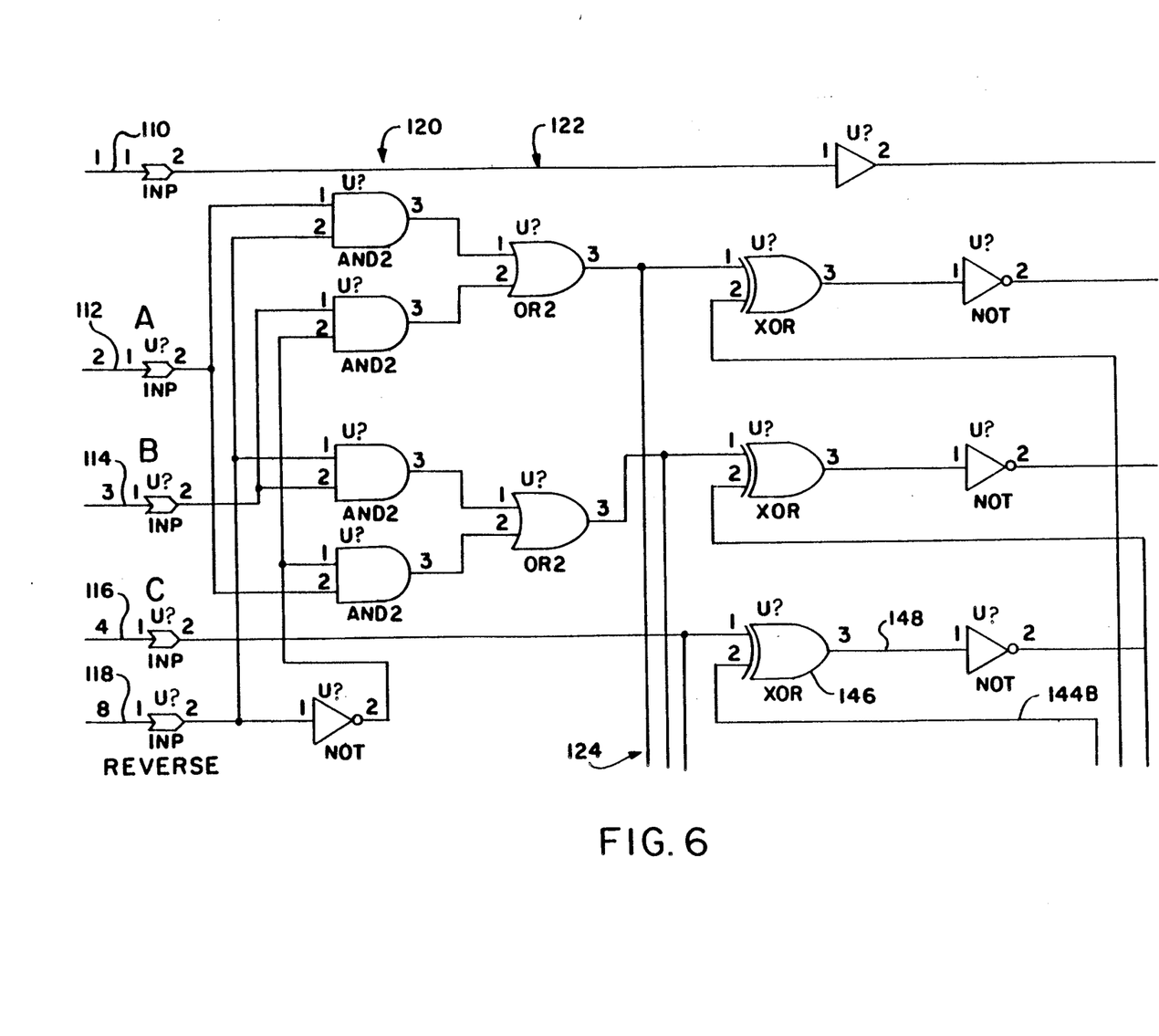
FIG. 6 is a portion of controller logic circuits for controlling normal-operation gating signals to the main switching transistors of the inverter.
Figure 7:
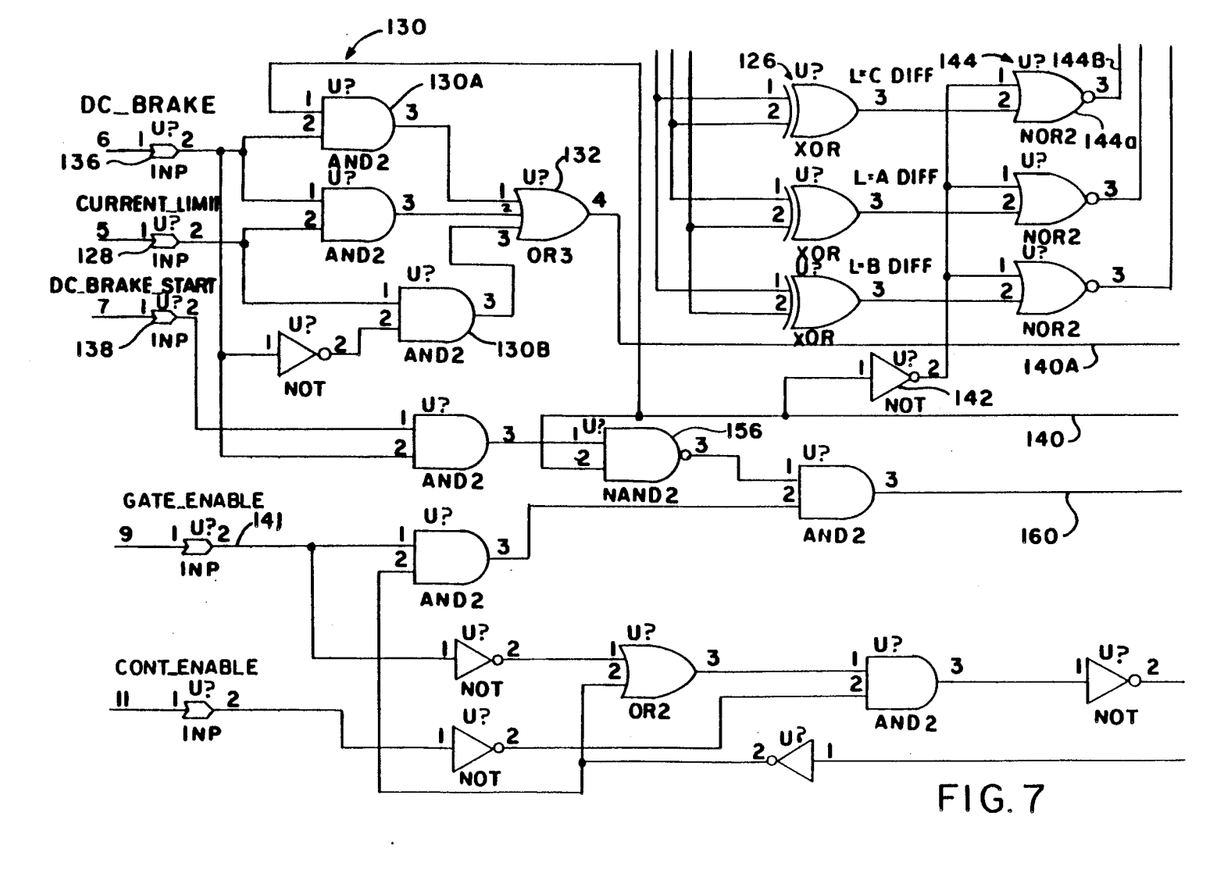
FIG. 7 is another portion of controller logic circuits, including braking start signal logic and current limit latch logic.
Figure 8:
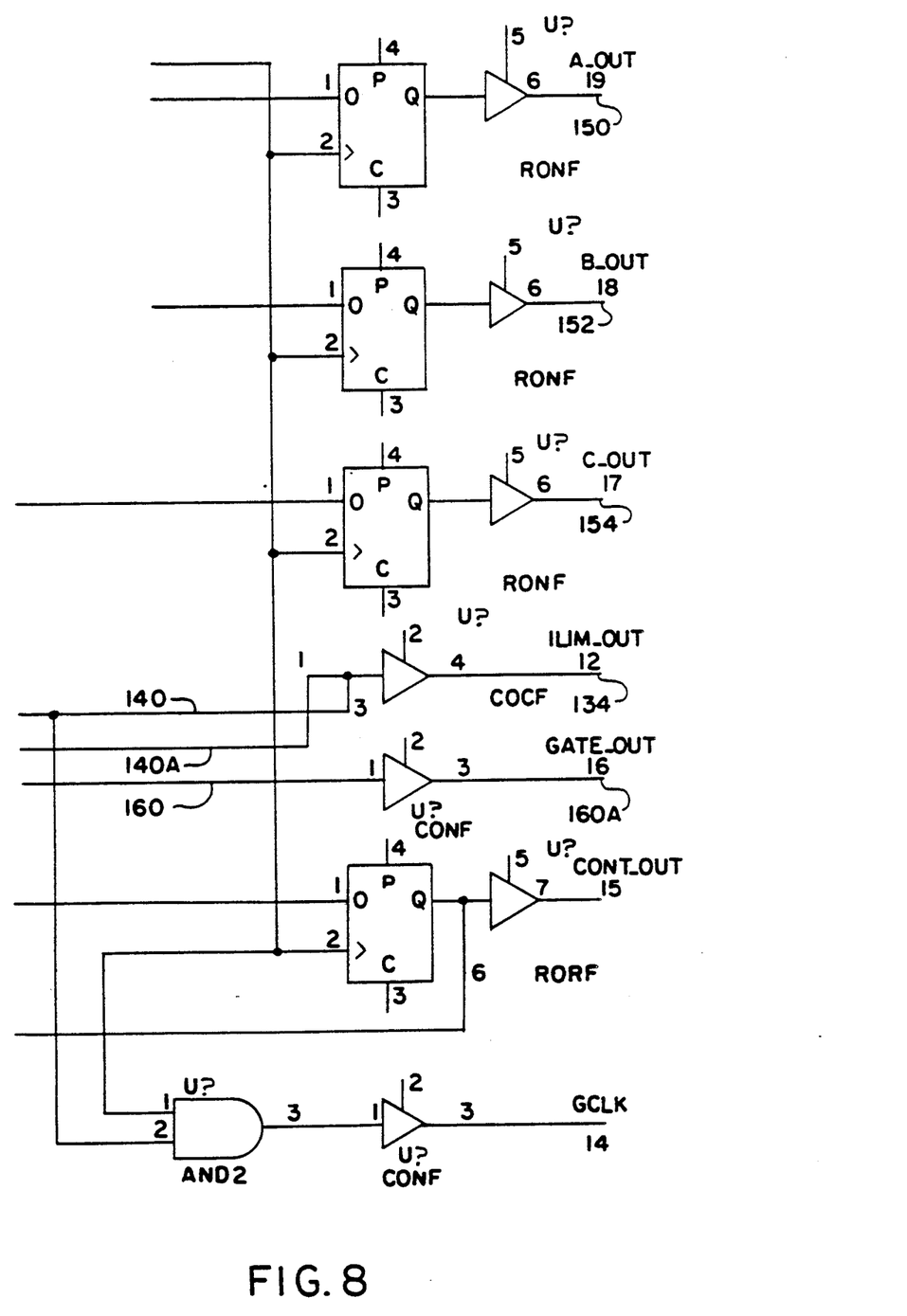
FIG. 8 is an output-circuit portion of controller logic circuits of the inverter.

FIGS. 6, 7, and 8 apply to this portion of the description. In the upper left-hand corner of FIG. 6, input 1, 110, is a clock signal. It drives all of the flip-flops of FIG. 8. The A, B and C terminals 112, 114, 116 are the gating signals for the inverter, preferably generated in the microprocessor. They are normal-operation gating signals.

The REVERSE input 118 at lower left and the first set of AND gates 120 combine signals to go into the first set of OR gates 122. Together they can interchange the gating signals of two of the phases to reverse the phase rotation.

Three conductors 124 from these OR gates 122 go down to the exclusive OR gates 126 in the middle of FIG. 7. Those exclusive OR gates pick out which gating signal is different from the other two. In the present example there are one signal in the lower group of switches and two (turned on) at that time in the upper group.

Input 128, labeled "current limit" on the left-hand side of FIG. 7, is supplied with a signal from a current limit comparator 62 (FIG. 1), whenever bus current exceeds a programmable reference signal 62b. The bus current signal fed to comparator 62 can be derived from either the positive or negative DC bus 52 of the inverter by means of a shunt resistor 54 and a differential amplifier 56 of FIG. 1. (Alternatively, any of a number of commercially available wide-bandwidth DC current transformers can be used to obtain the comparator signal.) A nonlinear circuit is used to extend the peaks of the actual bus current as described in the above-mentioned patent application.

In normal operation of the drive, "DC.BRAKE" input 136 and "DC.BRAKE.START" input 138 are held low, and input 128 signal is gated through an AND gate 130b and an OR gate 132 (FIG. 7) along line 140A to an output pin 12 (134) of FIG. 8. This pine 134 simply serves as a node to allow the current limit signal to be fed back to other gates in the logic circuit.

This feedback signal is applied along line 140 through an inverter 142 to a group of three NOR gates 144 (FIG. 7). If, as was previously assumed, the gating signal of C phase is for a different bus than the other two, the output of a gate 144a will be the only NOR gate output to go high. Its output signal, 144b, is brought to exclusive OR gate 146 of FIG. 6. This causes the exclusive OR gate 146 to invert the C phase signal, causing zero voltage to be applied to the motor for the entire time interval in which input 128 is active.

Further details of the normal current limit action can be found in the above-mentioned patent application.

The group of gates labeled 130 in FIG. 7 allow the operation of the current limit circuitry to be changed to enable the two modes of DC braking. Whenever the DC BRAKE input 136 is active, the current limit feedback signal 140 is gated through an AND gate 130 and an OR gate 132 to lines 140 and 140A. This path closes a positive feedback loop, effectively turning signal 140 into a latched current limit signal. Thus when signal 136 is made active, the current limit signal 128 is latched.

Mode 1 DC braking is enabled by bringing both inputs 136 and 138 high after freezing the A, B, C gating inputs 112, 114, 116 into one of six possible states. This causes a pin 1 on NAND gate 156 to become active. Then the current limit signal 140 is latched active in response to a CURRENT.LIMIT input 128, the output of 156 becomes inactive, prohibiting GATE.ENABLE signal 141 (FIG. 7) from making GATE.OUT output 160A active (FIG. 8). External circuitry requires signal 160A to be active before any of the six inverter switches are gated. The latch may be cleared by bringing signal 136 inactive and signal 138 active.

Thus, in the Mode 1 configuration a cycle of DC braking is initiated by bringing signal 136 inactive to clear the latch 140 while holding signal 138 high. At this point three inverter switches are gated, applying voltage to the motor, and causing current to increase. When bus current builds to a predetermined programmed level, input 128 becomes active, and signal 140 is latched, causing the inverter switches to turn off until signal 136 is again brought inactive and 138 brought active to clear the latch 140.

Mode 2 DC braking operates similarly to Mode 1 except that the signal 138 is inactive while 136 is active. In this mode the latched current limit signal 140 is not able to affect the GATE.OUT signal 160A. Instead, latched signal 140 is directed through the NOT gate 142 and NOR gates 144 (FIG. 7) to cause the one gating signal which is different from the other two to change polarity as it would in a normal current limit action.

When DC.BRAKE is commanded (block 164 of FIG. 9), the waveform generator stops the PWM waveform at a position 90 electrical degrees behind the peak of the normal stator voltage and where the phase commands to the logic circuit are not all the same. (Throughout DC braking these phase command inputs to the logic circuit remain the same). After the last PWM command has been executed the waveform generator switches to the first mode of DC BRAKING (block 166, FIG. 9). This is done by setting to active both the DC.BRAKE 136 input and the DC.BRAKE.START 138 input to the logic circuit.

This condition is held until current limit is reached, at which time all phase commands from the logic circuit are turned off (this is done by clearing the GATE_OUT signal 160A (FIG. 8) which turns off all phase commands). As stated above, this is the difference between Mode 1 and Mode 2. When current limit is reached in Mode 2 the odd output phase command is switched to the same state as the other (instead of turning them all off). This current limit condition is latched, so even if the drive current decreases so as to come out of current limit, the phase commands will remain in this current limit state.

This current limit latch 140 is cleared by clearing the DC_BRAKE input and setting the DC_BRAKE_START input to the logic circuits (FIG. 7). This clear command is executed at a predefined frequency so that the switching of the phase commands occurs at this predefined rate. After this clear command is executed the output phase commands return to the previous state in which two phases are the same and one is opposite.

Usually Mode 1 operation continues for a user defined number of switching periods at which time MODE 2 is entered. This is done by setting the DC_BRAKE command and clearing the DC_BRAKE_START command. There is an exception to the above sequence that occurs at low speeds. Mode 1 is not needed at low speeds and causes undesired "backup" when the apparatus starts DC braking. To avoid this problem Mode 1 is disabled if DC braking is entered below a user-preselected speed.

In addition to the above sequence of events the current limit setting is adjusted, 62b, FIG. 3. When DC braking is entered, a user-selected current-limit setting is used. The current-limit setting is "ramped up" to the user's preselected setting. This ramping up of the current limit setting has helped to resolve problems where the DC bus has overcharged in Mode 1.

Then, at a user-defined time after DC braking started, another user-selected current limit setting is used. The first current-limit setting is used as a STOPPING limit while the second setting is a HOLDING limit. The STOPPING limit is set to give additional stopping torque, which in turn causes greater motor heating. Then the HOLDING limit is set to give sufficient current to hold the drive without the undesirable excessive heating of the motor.

Figure 9:
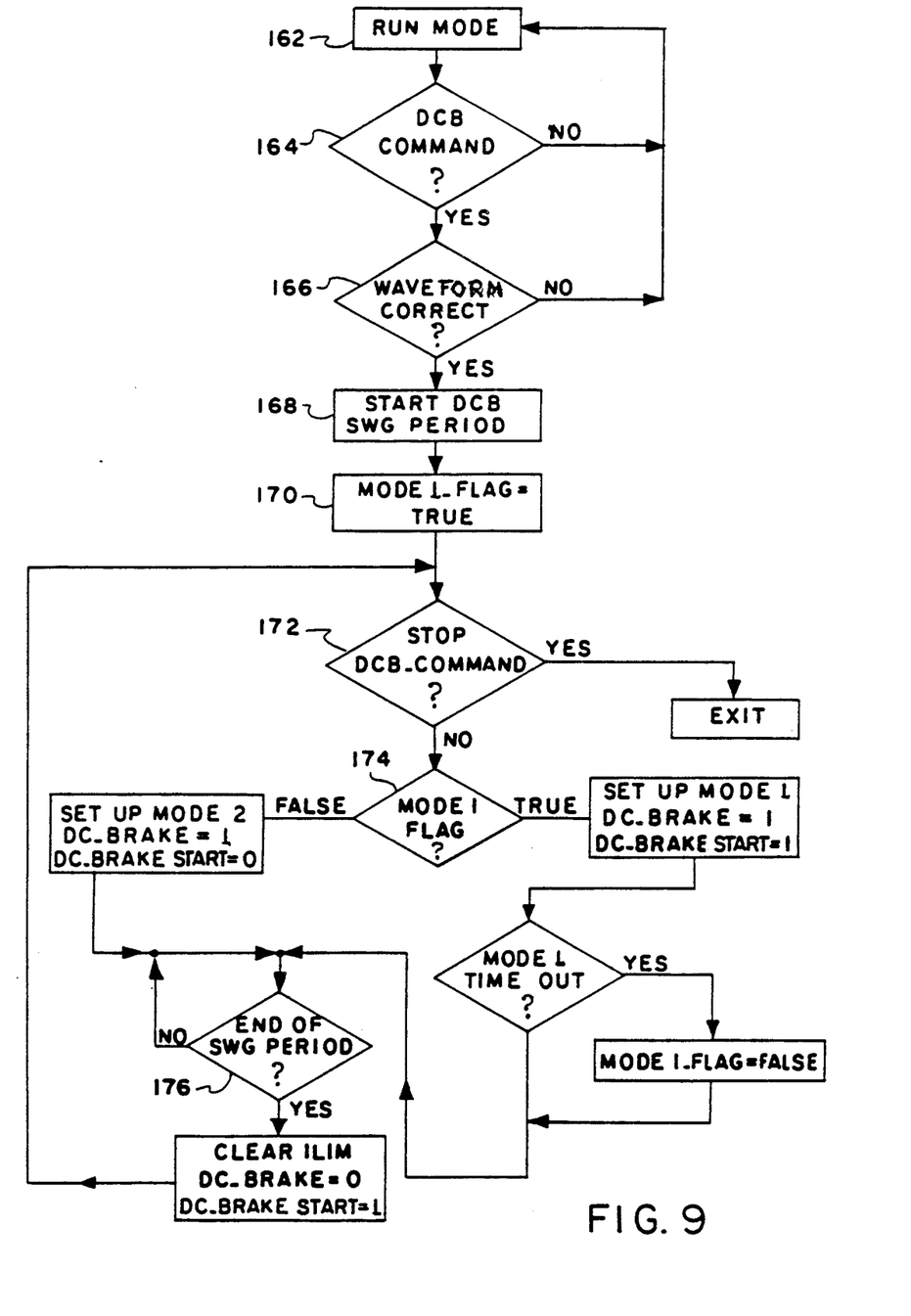
FIG. 9 is a flow chart of steps in the braking procedures of the present invention.

FIG. 9, which is a flow chart of the braking operations, shows at the top a block 162 labeled "Run Mode". A description of this chart serves as a recapitulation of the operation description above. Any time that the motor is being run, the algorithm polls for a DC braking command, block 164. There are several ways in which this command can occur, as in the following examples:
 (1) releasing the jog key and decelerating to a user-definable speed.
 (2) pressing the stop key/pushbutton, and decelerating to a user-definable speed.
 (3) pressing the Emergency Stop pushbutton.
 (4) setting the current speed reference to 0.00 and decelerating to 0.8 Hz.

The next block, 166, in the flow sequence of FIG. 9 is labeled "Waveform correct?". The system is looking for a spot in the waveform that is suitable for braking. This is more critical at lower speeds. An example would be when using the "jog" function to index the shaft into a desired position. When jogging at low speeds, if DC braking starts at a wrong place in the waveform, backlash tends to occur in the motor.

When the waveform is correct the system prepares to start DC braking. "Start DCB switching period" block 168, is a time reference which occurs every 0.6 milliseconds. The flow chart is merely defining it as a reference for the beginning of the switching period.

Next in the sequence is block 170, "Mode_1_flag=-true", which sets up the DC braking algorithm to start Mode 1. The flag remains "true" until Mode 1 times out, then it switches to "false". At the next switching time thereafter the system switches to Mode 2.

The lower half of the diagram of FIG. 9 is for both modes 1 and 2. Here the flow of events encounters a block 172 "Stop DCB command?". When either the DC braking times out or the operator physically stops it, the system drops out of the DC braking mode, and the waveform starts up, at a point in the waveform 90 electrical degrees ahead of where it had stopped with the given phase commands. This is important when going from DC braking directly back to a RUN condition, and gives bumpless starting from DC braking.

If "Mode 1_flag" is true (block 174), the system is in Mode 1, and appropriate conditions described above are set up as the inputs to the logic circuits of FIGS. 6-8. The system sets both the DC_BRAKE input 136 and the DC_BRAKE start input 138 to high, which tells the logic circuits that the system is in Mode 1.

After the first mode times out the system goes to the second mode of DC braking. The DC_BRAKE input signal at 136 is set high and the DC_BRAKE_START input signal at 138 is set low. The timing out of Mode 1 sets the Mode 1 flag to "false". When the system reaches the "End of switching period?" block, 176, it waits until the switching period is complete, which is 0.6 millisecond, and clears the current limit latch 140.

The system is in Mode 2. To clear the latch 140 the system has set DC_BRAKE 136 to zero and DC_BRAKE START 138 to 1. That tells the logic circuits to clear the current limit latch 140, which puts the system back into the normal mode of having two transistors of one bus and the other one phase's opposite transistor turned on. The system then repeats the entire process above.

During braking, the system repeats the procedure of Mode 1 for a predetermined length of time. After expiration of that preset time the Mode 1 flag is removed and the system goes into Mode 2. It then repeats Mode 2 for a preset time interval.

Although the invention has been described with the aid of an example, which is the best embodiment, it is usable in many other forms. The scope of the invention is determined by the claims.

We claim:

1. A method for braking an inverter-driven induction motor having at least three phases, in which an inverter drive has a PWM waveform generator, and has a first group of main switches connected from each phase with a first polarity of DC bus and a second group of main switches connected from each phase with a second polarity of DC bus, the switches being controllable by commands, comprising the steps of:
 stopping the PWM waveform generator;
 starting a first mode of braking by turning on the main switches, in the first switch group, of two phases, and turning on the main switch, in the second switch group, of a third phase;
 monitoring the current and, when a predetermined current limit is reached, turning off all phase commands;

maintaining the main switches in their respective on or off states even after the current of the drive decreases below the current limit;

repeating the above cycle at a predetermined rate to establish an average braking torque in the motor.

2. A method for braking an inverter-driven induction motor having at least three phases, in which an inverter drive has a PWM waveform generator, and has a first group of main switches connected from each phase with a first polarity of DC bus and a second group of main switches connected from each phase with a second polarity of DC bus, the switches being controllable by commands, comprising the steps of:

stopping the normal PWM waveform generator;

starting a second mode of braking by turning on the main switches, in the first switch group, of two phases, and turning on the main switch, in the second switch group, of a third phase;

monitoring the current and, when a predetermined current limit is reached, switching the main switch of the third phase, in the second switch group, to the same state as that of said main switches in the first switch group of said two phases;

maintaining the switches in those states even after the current of the drive decreases below the current limit;

repeating the above cycle at a predetermined rate to establish an average braking torque in the motor.

3. A method for braking an inverter-driven induction motor having at least three phases, in which an inverter drive has a PWM waveform generator, and has a first group of main switches connected from each phase with a first polarity of DC bus and a second group of main switches connected from each phase with a second polarity of DC bus, the switches being controllable by commands, comprising the steps of:

stopping the normal PWM waveform generator;

starting a first mode of braking by turning on the main switches, in the first switch group, of two phases, and turning on the main switch, in the second switch group, of a third phase;

monitoring the current and, when a predetermined current limit is reached, turning off all phase commands;

maintaining the main switches in their respective on or off states even after the current of the drive decreases below the current limit;

repeating the above cycle of the three immediately preceding steps, relating to the first mode of braking, a plurality of times at a predetermined rate to establish an average braking torque in the motor;

starting a second mode of braking by turning on the main switches, in the first switch group, of two phases, and turning on the main switch, in the second switch group, of the third phase;

monitoring the current and, when a predetermined current limit is reached, switching the main switch, in the first switch group, of the third phase, to the same state as that of said main switches in the first switch group, of said two phases;

maintaining the switches in those states even after the current reduces below the current limit;

repeating the cycle of the three immediately preceding steps, relating to the second mode of braking, a plurality of times.

4. A method as in claim 3 and further comprising a step before the step of turning on the main switches in the first switch group of two phases and turning on the main switch in the second switch group of the third phase, as follows:

sensing the speed of the motor and, if it is less than a predetermined speed, omitting the other steps that precede the step of starting a second mode.

* * * * *